US008160277B2

(12) United States Patent
Noethlings et al.

(10) Patent No.: US 8,160,277 B2
(45) Date of Patent: Apr. 17, 2012

(54) METHOD FOR OUTPUTTING AUDIO SIGNALS AND AUDIO DECODER

(75) Inventors: Rolf Noethlings, Stuttgart (DE); Gerd Spalink, Stuttgart (DE)

(73) Assignee: Sony Deutschland GmbH, Berlin (DE)

( * ) Notice: Subject to any disclaimer, the term of this patent is extended or adjusted under 35 U.S.C. 154(b) by 1101 days.

(21) Appl. No.: 12/029,772

(22) Filed: Feb. 12, 2008

(65) Prior Publication Data

US 2008/0240464 A1 Oct. 2, 2008

(30) Foreign Application Priority Data

Mar. 31, 2007 (EP) .................................... 07006799

(51) Int. Cl.
*H04B 1/00* (2006.01)

(52) U.S. Cl. ............................................ 381/119; 381/1

(58) Field of Classification Search .................. 381/119, 381/1

See application file for complete search history.

(56) References Cited

U.S. PATENT DOCUMENTS 4,577,302 A * 3/1986 Allen ......................... 369/44.11
5,883,962 A 3/1999 Hawks

FOREIGN PATENT DOCUMENTS

EP 0 347 031 A2 12/1989
EP 0 347 031 A3 12/1989
EP 1 003 283 A2 5/2000
EP 1 003 283 A3 5/2000

OTHER PUBLICATIONS

"TEA6320 Sound Fader Control Circuit" Philips Semiconductors Preliminary Specification, XP002245402, Dec. 19, 1995, pp. 1-40.
Office Action issued Jul. 20, 2011 in Chinese Patent Application No. 200810091850.1 (English translation only).

* cited by examiner

*Primary Examiner* — Douglas Menz
(74) *Attorney, Agent, or Firm* — Oblon, Spivak, McClelland, Maier & Neustadt, L.L.P.

(57) ABSTRACT

Method for outputting an audio signal to an audio output, comprising outputting a first audio signal to said audio output; providing a second audio signal; determining a point in time, wherein at said point in time said first audio signal or a derivative of said first audio signal or a derivative of said second audio signal is essentially equal to zero; switching, at said point in time, said audio output from outputting said first audio signal to outputting said second audio signal.

16 Claims, 10 Drawing Sheets

METHOD FOR OUTPUTTING AUDIO SIGNALS AND AUDIO DECODER

The invention relates to a method for outputting audio signals, to an integrated circuit and to an audio decoder.

BACKGROUND

Today's transmitted sound signals provide the opportunity to playback audio signals in different ways, e.g. monaural or in stereo. Some sound signals may also provide different audio contents, e.g. bilingual signals sometimes transmitted together with a television signal allow the user to switch between different languages. Different sound signals may also be provided by a data carrier, e.g. compact disc or digital versatile disc (DVD).

Receivers or decoders need to switch between the different modes or different contents during operation for different reasons, e.g. due to a user request, changing reception situation, e.g. noise, changing of content or the like.

It is an object of the invention to provide a method for outputting audio signals allowing switching between a first and second audio signal, wherein the listener is not disturbed by e.g. clicks or other sound distortions.

DETAILED DESCRIPTION

In the following, embodiments of the invention are described. It is important to note that all described embodiments in the following may be combined in any way, i.e. there is no limitation that certain described embodiments may not be combined with others.

Figure 1A:
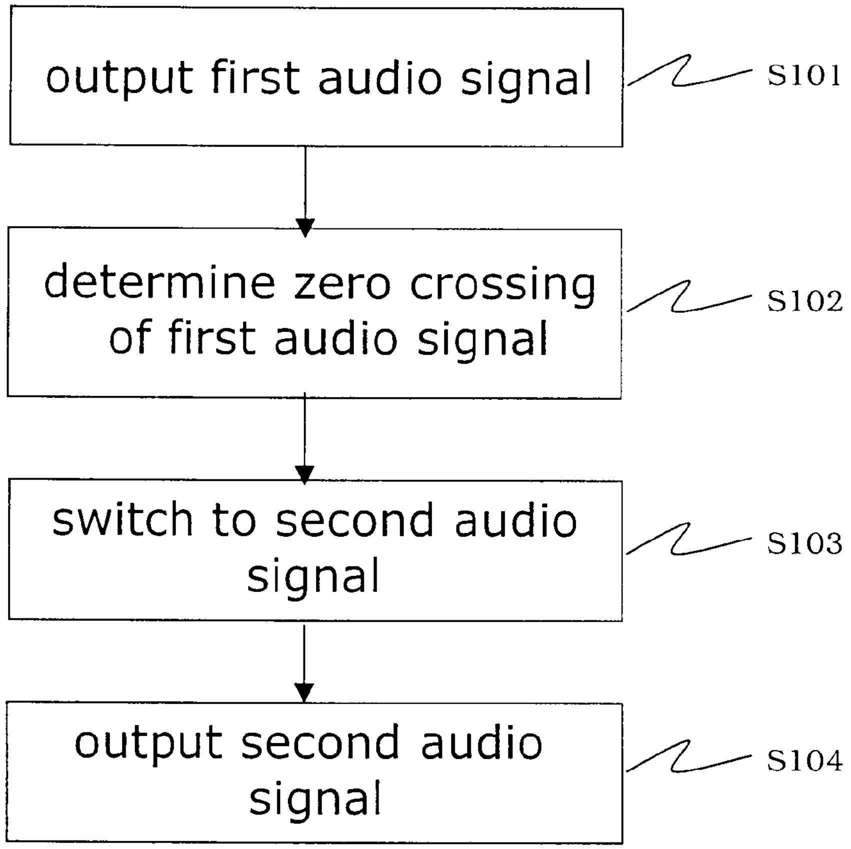
FIG. 1 shows an embodiment of a method for outputting audio signals.

In FIG. 1A, in a first step S101, a first audio signal is output. The first audio signal may e.g. be a mono signal which may e.g. be amplified and output by a loudspeaker to a user.

In step S102 zero crossings of the first audio signal are determined. Thus, at a certain point in time, a zero crossing of the first audio signal may be determined.

At the certain point of time, in step S103, switching to a second audio signal may take place. Then, in step S104, the second audio signal is output e.g. by a loudspeaker.

As is apparent, switching to the second audio signal in step S103 essentially takes place at a zero crossing of the first audio signal, i.e. at a point in time when the first audio signal is zero and, therefore, no sound is output, e.g. by a loudspeaker, because switching takes place at the certain point in time as described above, the user may not experience unpleasant audio sounds such as e.g. a clicking sound. "Essentially equal to zero" may be interpreted in the context of a certain application. For example, "essentially equal to zero" may mean below a low threshold, i.e. close to zero. This may also depend on the maximum amplitude occurring in certain applications.

Figure 1B:
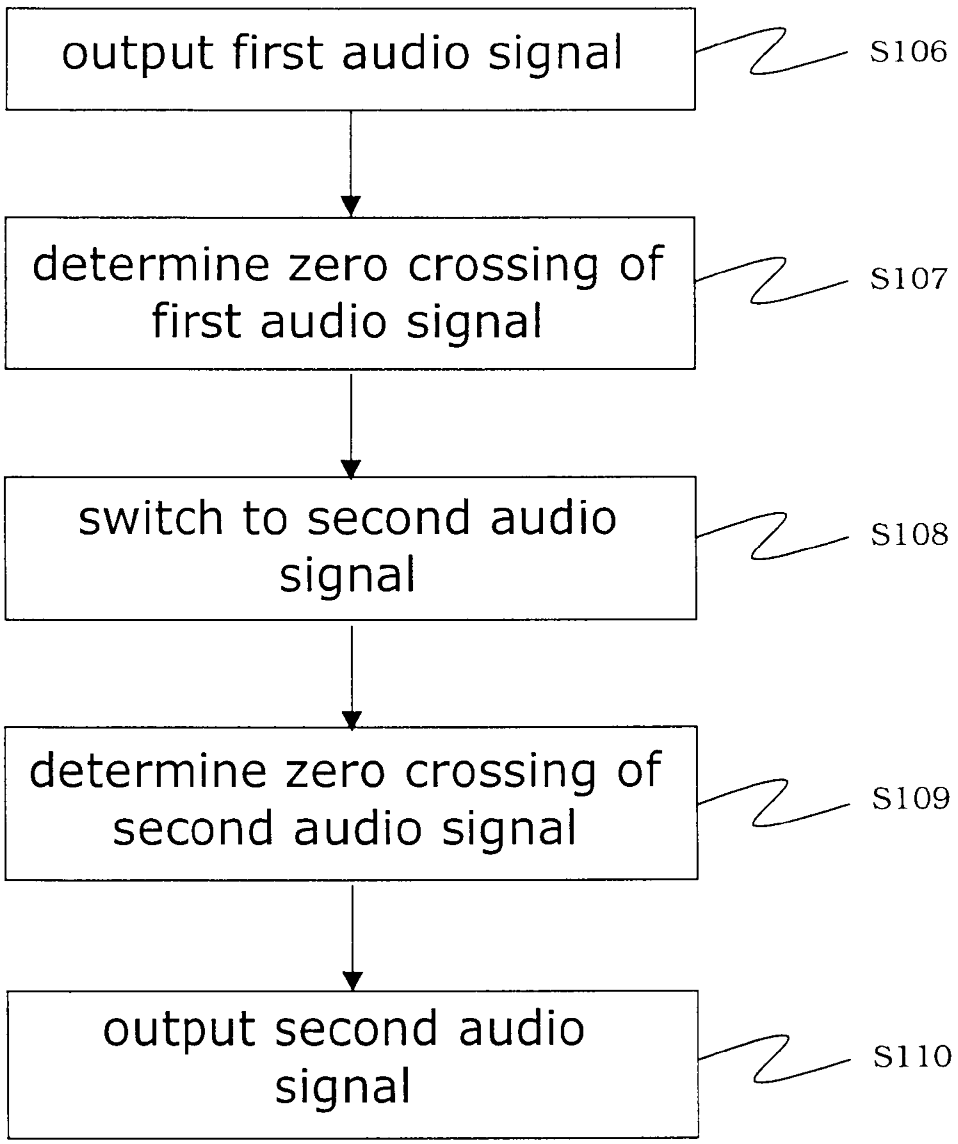

It may also be possible to additionally determine zero crossings of the second audio signal as shown in the embodiment of the invention according to FIG. 1B.

In FIG. 1B, in step S106, a first audio signal is output. In step S107, zero crossings of the first audio signal are determined.

In step S108, switching to a second audio signal is performed, wherein the switching takes place at a zero crossing of the first audio signal.

In step S109, the next zero crossing of the second audio signal after the zero crossing of the first audio signal at which switching in step S108 took place, is determined. In other words, in step S109, a zero crossing of the second audio signal is determined following the last zero crossing of the first audio signal determined in step S107.

Finally, in step S110, the second audio signal is output.

Between the zero crossing of the first audio signal determined in step S107 and the zero crossing of the second audio signal determined in step S109, no audio signal or a zero audio signal (muted state) may be output. Therefore, no clicks will be noticed by a listener.

Thus, according to the embodiments shown in FIGS. 1A and 1B, it may be possible to determine a further point in time, wherein at said further point in time the second audio signal is essentially equal to zero, wherein outputting the second audio signal is started at the further point in time. Further, between the point in time and the further point in time, no audio may be output (mute state).

Figure 2:
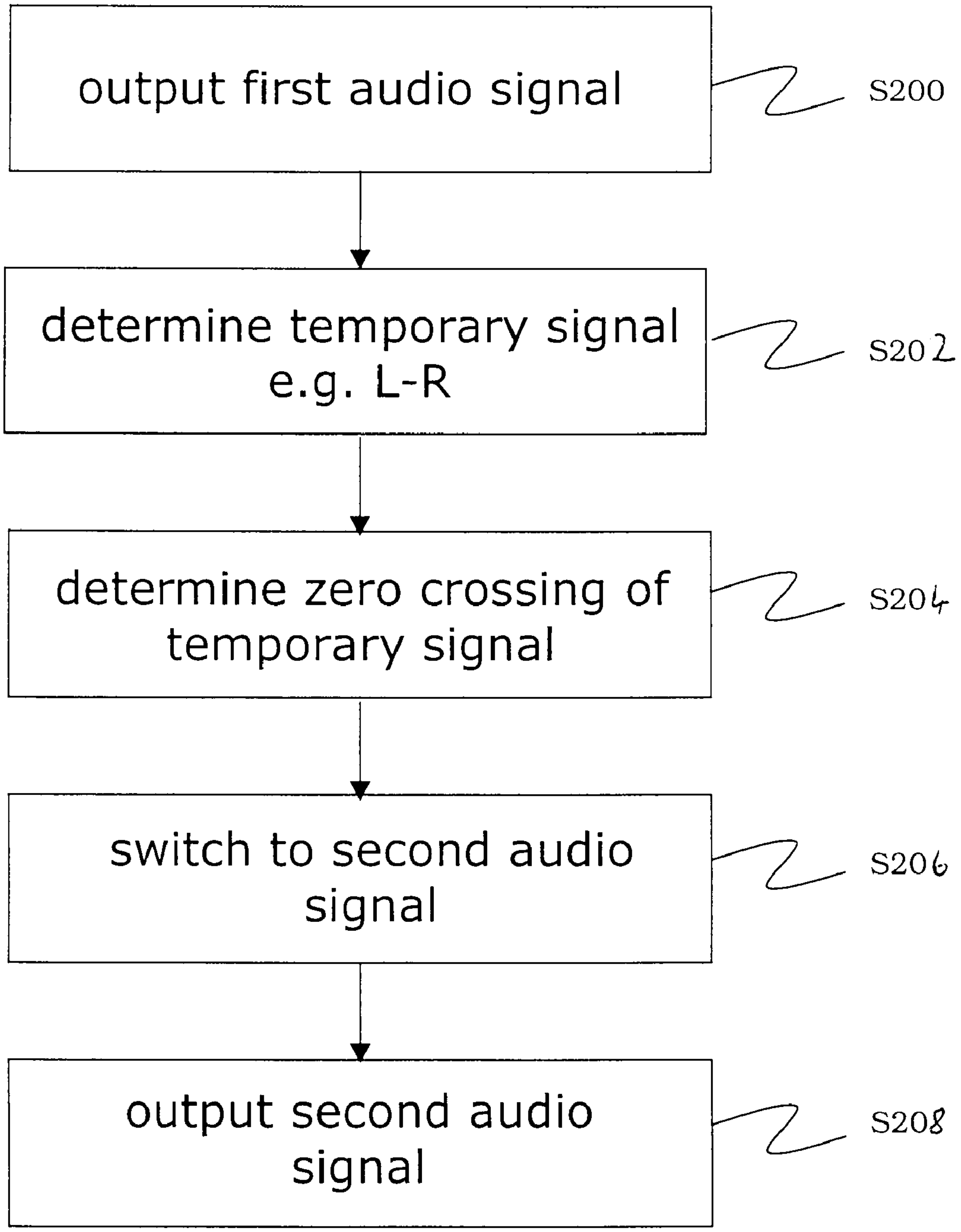
FIG. 2 shows a further embodiment of a method for outputting audio signals.

FIG. 2 shows a further embodiment of the invention, wherein in step S200, a first audio signal is output. The first audio signal may e.g. be a stereo audio signal comprising a left and right audio channel.

In order to realize a switching to a second audio signal without noticeable clicks, in step S202, a temporary signal is determined based on the first audio signal. For example, a difference signal L−R corresponding to a subtraction of the right audio channel from the left audio channel may be determined. The difference signal may correspond to a received signal, e.g. by an analogue radio receiver. If the method is applied in a television set, then the difference signal may need to be calculated based on the received sound signals.

In step S204, a zero crossing of the difference signal L−R is determined. Then, in step S206, switching to a second audio signal may take place at a detected zero crossing. The second audio signal may correspond to a monaural audio signal e.g. corresponding to a monaural version of the first audio signal. Then, in step S208, the second audio signal is output.

A listener may experience no clicking sound because at the time of switching to the second audio signal in step S206, the difference of the left and right audio channel is equal to zero.

Of course, the embodiment of FIG. 2 works likewise if the first audio signal is a monaural audio signal and the second audio signal is a stereo audio signal. In this case, e.g. a receiver checks if a stereo signal is available, i.e. it is possible to determine the difference signal L−R. Then switching to stereo occurs, as above, when the difference signal L−R has a zero crossing.

In a further embodiment, it may also be possible to determine an intermediate audio signal, wherein the intermediate audio signal corresponds to a mixture or superposition of the first and second audio signals. Outputting the intermediate audio signal may start at the point in time for a predetermined period of time. Thus, within a predetermined period of time after said point in time a mixture or superposition of the first and second audio signals may be output.

Within said predetermined period of time, the first audio signal may be faded out (blended out) and the second audio signal may be faded in (blended in), wherein the first and second audio signals are superimposed. Due to the blending out/blending in, the user may experience a sliding transition e.g. from mono to stereo (or vice versa) or from a first audio channel to a second audio channel.

Figure 3:
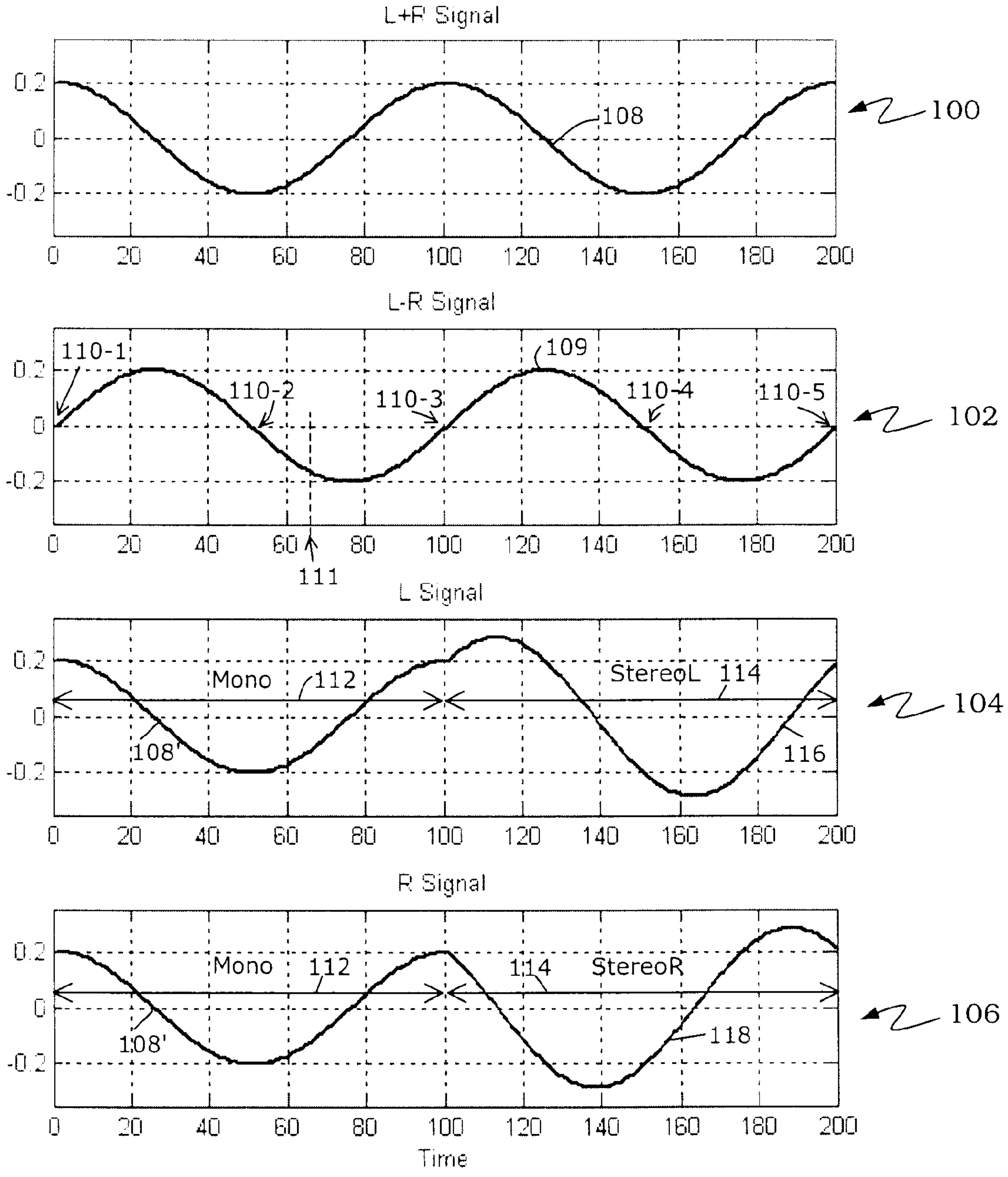
FIG. 3 shows diagrams for illustrating a switching from mono to stereo audio output.

FIG. 3 shows an example, where switching from outputting a mono audio signal to outputting a stereo audio signal occurs. FIG. 3 shows a first diagram 100, second diagram 102, third diagram 104, and fourth diagram 106.

In the first diagram 100, a monaural audio signal 108 is depicted which may e.g. be a combined signal of a left and right audio channel of a stereo audio signal. This signal may e.g. be received by a receiver e.g. radio or television receiver.

The second diagram 102 shows a difference signal 109 which may e.g. be received by a radio receiver or be determined based on received sound signals.

Second diagram 102 also depicts zero crossings 110 of difference signal 109, wherein at a respective zero crossing 110-1 to 110-5, difference signal 109 is equal to zero (zero crossing).

Second diagram 102 also depicts a point in time 111 at which a request to switch from monaural audio output to stereo output may be received. For example, the user might want to switch from monaural audio output to stereo audio output. Of course, a switching request may also be initiated automatically, because e.g. the reception quality of the stereo signal has been improved.

After the switching request has been received at point in time 111, the next (subsequent) zero crossing 110-3 is determined. In the second diagram 102, the switching request at point in time 111 has roughly been received at t=65. The next zero crossing of difference signal 109 following after said point in time 111 is zero crossing 110-3 at t=100.

At this point in time t=100, the audio output is switched from outputting the monaural audio signal to outputting a left and right channel L, R, i.e. stereo sound.

Third diagram 104 depicts the output of a left channel L, and fourth diagram 106 depicts the output of a right channel R.

As seen in third and fourth diagrams 104, 106, before t=100, i.e. before zero crossing 110-3 of difference signal 109, monaural audio is output during a mono playback period 112 (thus the same signal is output on the left and right channel). After t=100, in a stereo playback period 114, the signal of the left channel 116 and the signal of a right channel 118 is output on the left channel L and right channel R, respectively, as shown in third diagram 104 and 106, respectively.

When switching from mono to stereo sound or vice versa, a sliding transition may be performed. Thereby, e.g. the difference signal (L−R) may be weighted, and the weighing factor may be increased from zero to one slowly to switch from mono to stereo or decreased respectively to switch from stereo to mono.

Figure 4:
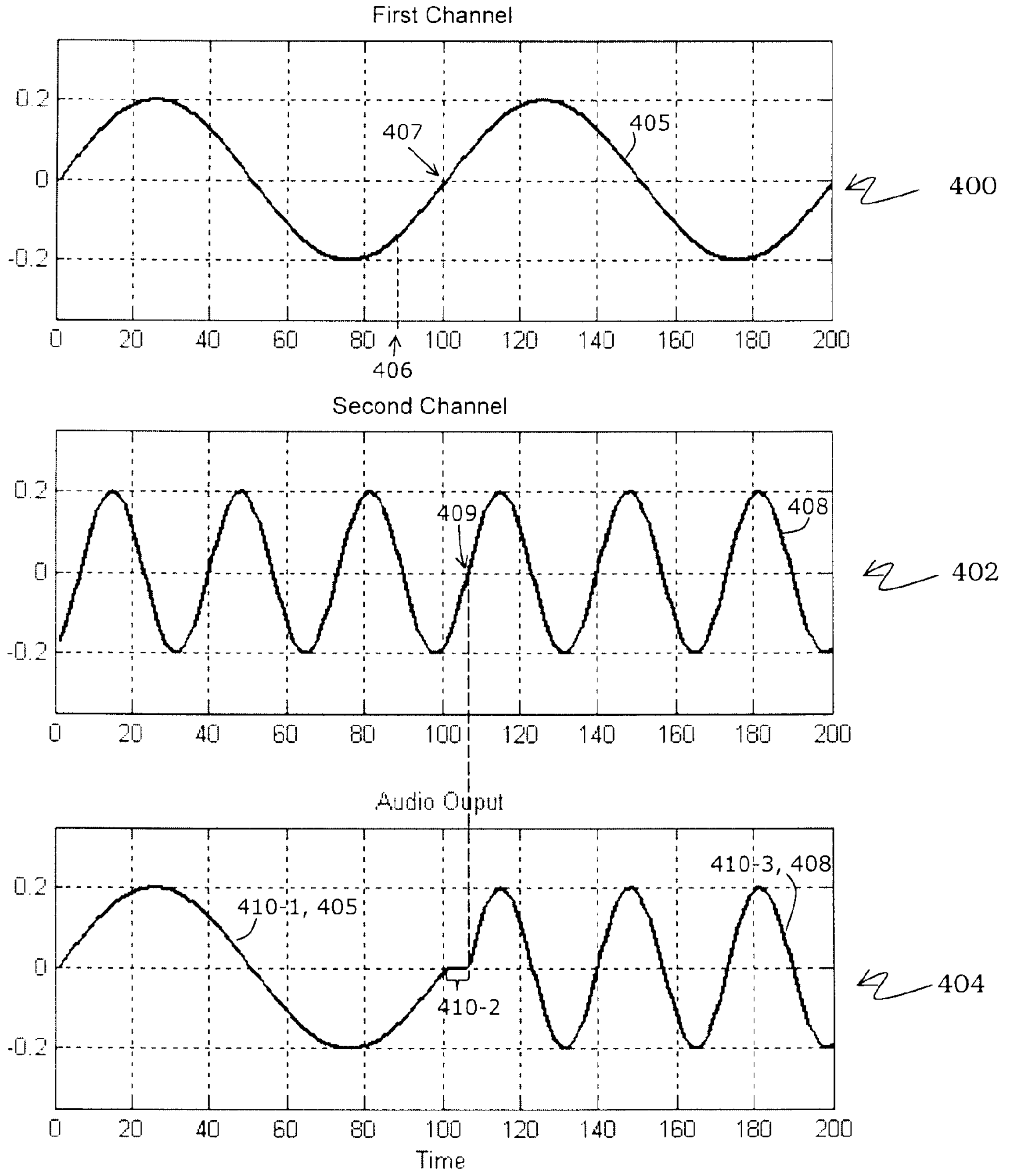
FIG. 4 shows diagrams for illustrating a switching from a first to a second channel.

FIG. 4 shows an example of switching between a first and second audio channel. The first audio channel shown in diagram 400 may e.g. correspond to an audio signal of a television program in a first language. The second channel shown in diagram 402 may correspond to an audio signal in a second language. Of course, there is no limitation as to the source of the first and second audio channel.

For example, the first and second audio channel may also correspond to different audio signals stored on a digital versatile disc or they may simply correspond to different television programs or radio station programs.

In fact the principles explained at hand of FIG. 4 may be applied whenever switching from one sound channel or source to another is necessary.

Diagram 404 corresponds to the audio output signal, wherein between t=100 and t=120, a switching from the first channel to the second channel occurs, as will be explained in the following.

In diagram 400, at point in time 406, i.e. roughly at t=90, a switching request may have been received. The switching request may e.g. be initiated by a user that wants to switch between the first and second channel.

After the switching request, the next zero crossing 407 of first audio signal 405 of the first channel is determined. As seen in diagram 400, the next zero crossing 407 after the switching request occurs at t=100.

Then, as seen in diagram 402, the next zero crossing 409 (subsequent zero crossing) of audio signal 408 of the second channel is determined. The next zero crossing 409 after t=100 of the second audio signal 408 occurs at about t=105.

As seen in diagram 404, the audio output signal 410 comprises three parts 410-1, 410-2 and 410-3. The first part 410-1 of audio output signal is equal to first audio signal 405 of first channel and lasts until t=100 corresponding to zero crossing 407 in diagram 400. The second part 410-2 is equal to zero and lasts from t=100 corresponding to zero crossing 407 until t≈105 corresponding to zero crossing 409 of second audio signal 408. The third part 410-3 of audio output signal is equal to second audio signal 408 of second channel depicted in diagram 402.

Thus, the audio output signal shown in diagram 404 corresponds to the first audio signal 405 until t=100 and to second audio signal 408 of the second channel from t≈105 corresponding to zero crossing 409 of diagram 402.

The second part 410-2 is, thus, a muted part which may not be noticed by the user as disturbing. Therefore, no clicks will be audible by a listener.

Figure 5:
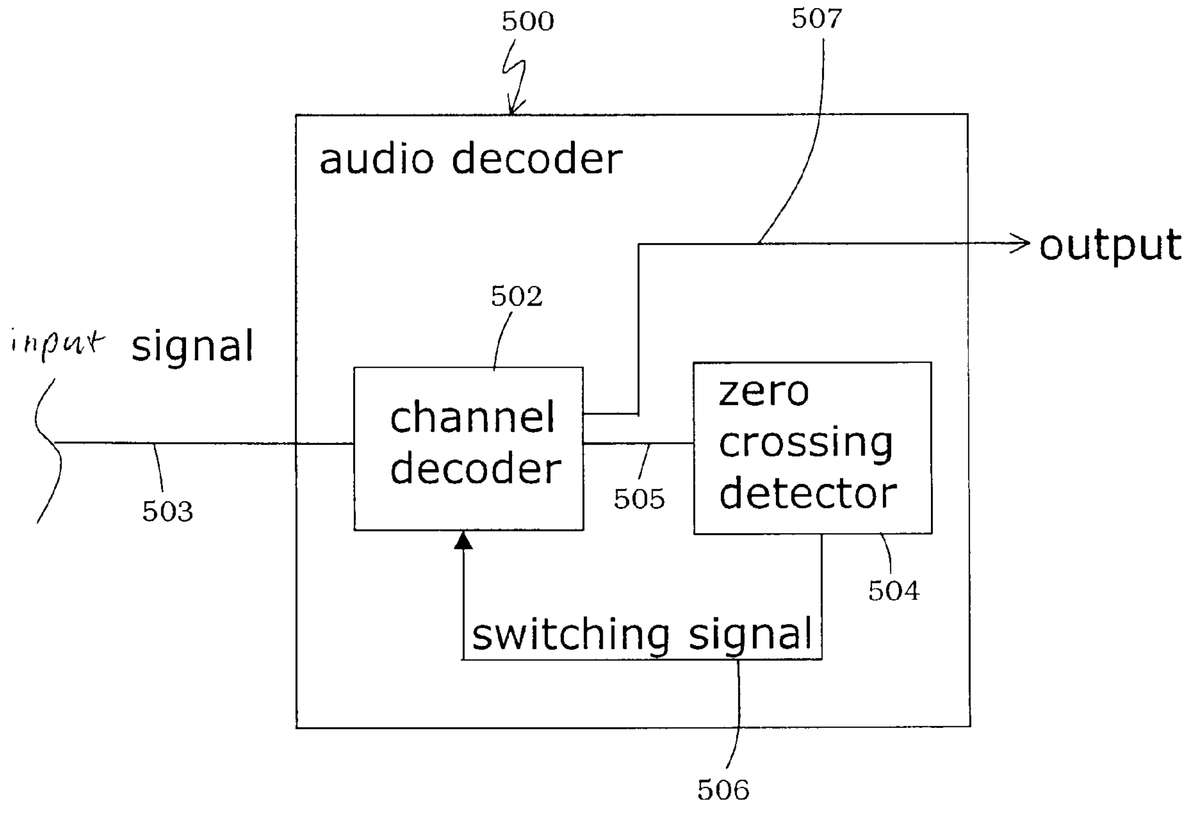
FIG. 5 shows an audio decoder according to an embodiment of the invention.

FIG. 5 depicts an audio decoder 500 comprising a channel decoding and processing unit 502 and a zero crossing detector 504.

Channel decoding and processing unit 502 receives an audio signal 503 and decodes a first and second audio signal 505 from an input signal, e.g. an audio signal. First and second audio signal 505 are supplied to zero crossing detector 504. The zero crossing detector 504 is, thus, configured to receive the first and second audio signal and further configured to determine a point in time, wherein at said point in time said first audio signal or a derivate of said first audio signal, or a derivate of said second audio signal is essentially equal to zero or a zero crossing occurred. At this point in time, zero crossing detector 504 outputs a switching signal 506 to channel decoding and processing unit 502. channel decoding and processing unit 502 outputs an output signal 507, wherein the output signal 507 corresponds to the first audio signal until the point in time where the zero crossing occurs and outputs the second audio signal afterwards.

Channel decoding and processing unit 502 may comprise a mode detector and/or a mechanism configured to determine the first and/or second audio signal e.g. based on a received difference signal L−R and sum signal L+R or L+R and L (television).

Figure 6:
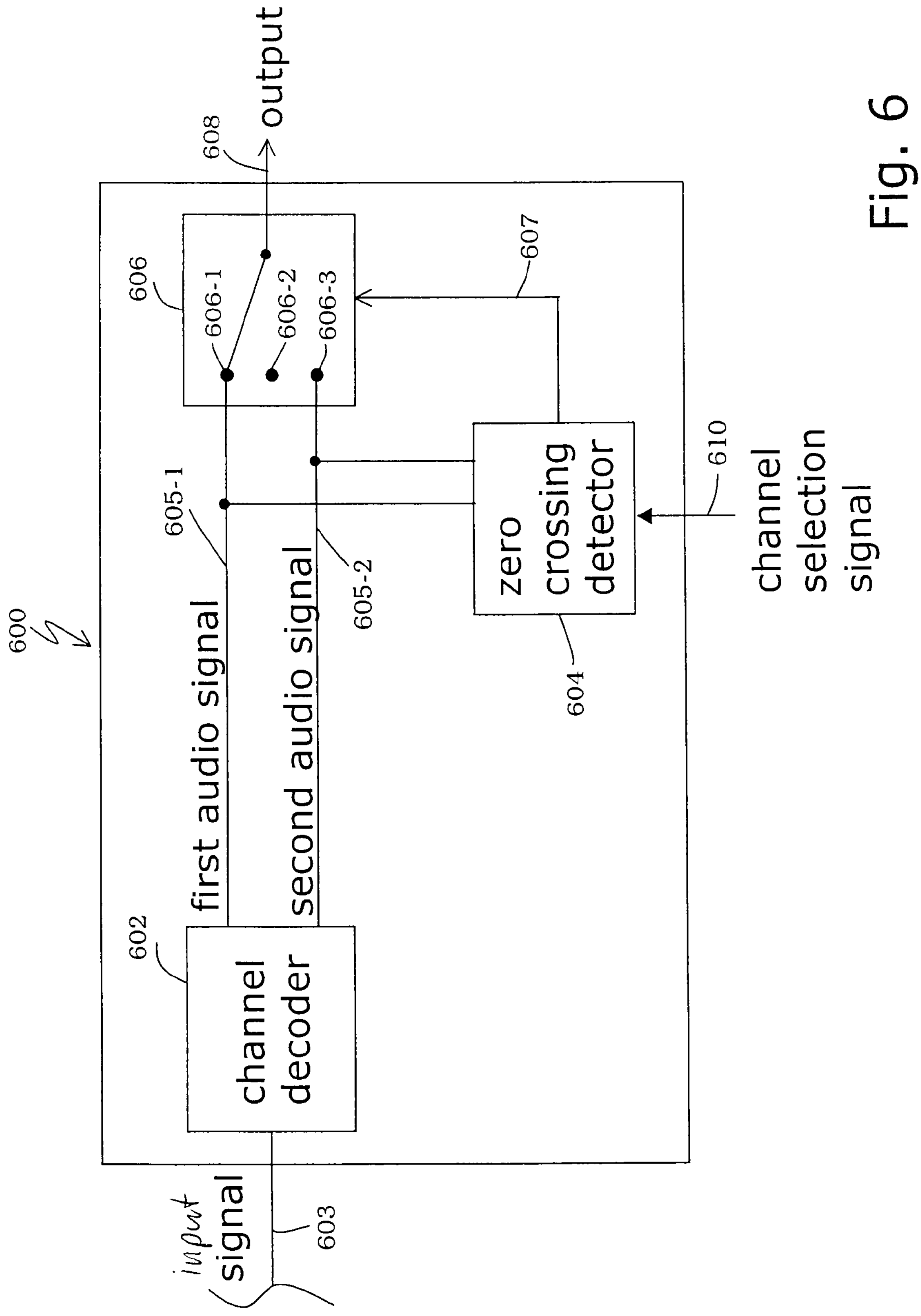
FIG. 6 shows an audio decoder according to a further embodiment of the invention.

FIG. 6 shows an audio decoder 600 comprising a channel decoder 602, zero crossing detector 604 and switch 606.

Channel decoder 602 receives an audio signal 603 and decodes from the audio signal 603 a first audio signal 605-1 and second audio signal 605-2. The zero crossing detector 604 upon receiving a channel selection signal 610 indicating that a switch from the first audio signal 605-1 to the second audio signal 605-2 should occur, detects a subsequent zero crossing of the first audio signal 605-1. In other words, when zero crossing detector 604 receives a channel selection signal 610 indicating a switching request, zero crossing detector 604 detects the next (subsequent) zero crossing of first audio signal 605-1. Further the zero crossing detector 605 detects the next (subsequent) zero crossing of the second audio signal 605-2 following after the zero crossing of first audio signal 605-1.

Based on the zero crossings of first and second audio signals 605-1, 605-2, zero crossing detector 604 determines a control signal 607 for controlling the switch 606. In the examples of FIG. 6, switching from the first audio signal 605-1 to second audio signal 605-2 is depicted, and, consequently, switch 606 is in a first position 606-1 such that output signal 608 corresponds to first audio signal 605-1. After detecting the next zero crossing of first audio signal 605-1 as described above, i.e. the next zero crossing after receiving a channel selection signal 610 indicating a switching request, zero crossing detector 604 controls switch 606 to switch to the second position 606-2. Therefore, while switch 606 is at second position 606-2, output signal 608 will be equal to zero. When zero crossing detector 604 detects the next zero crossing of second audio signal 605-2 as described above, zero crossing detector 604 outputs a control signal 607 indicating that switch 606 be switched to the third position 606-3. Thus, after the next zero crossing of second audio signal 605-2, output signal 608 will be equal to second audio signal 605-2.

Figure 7:
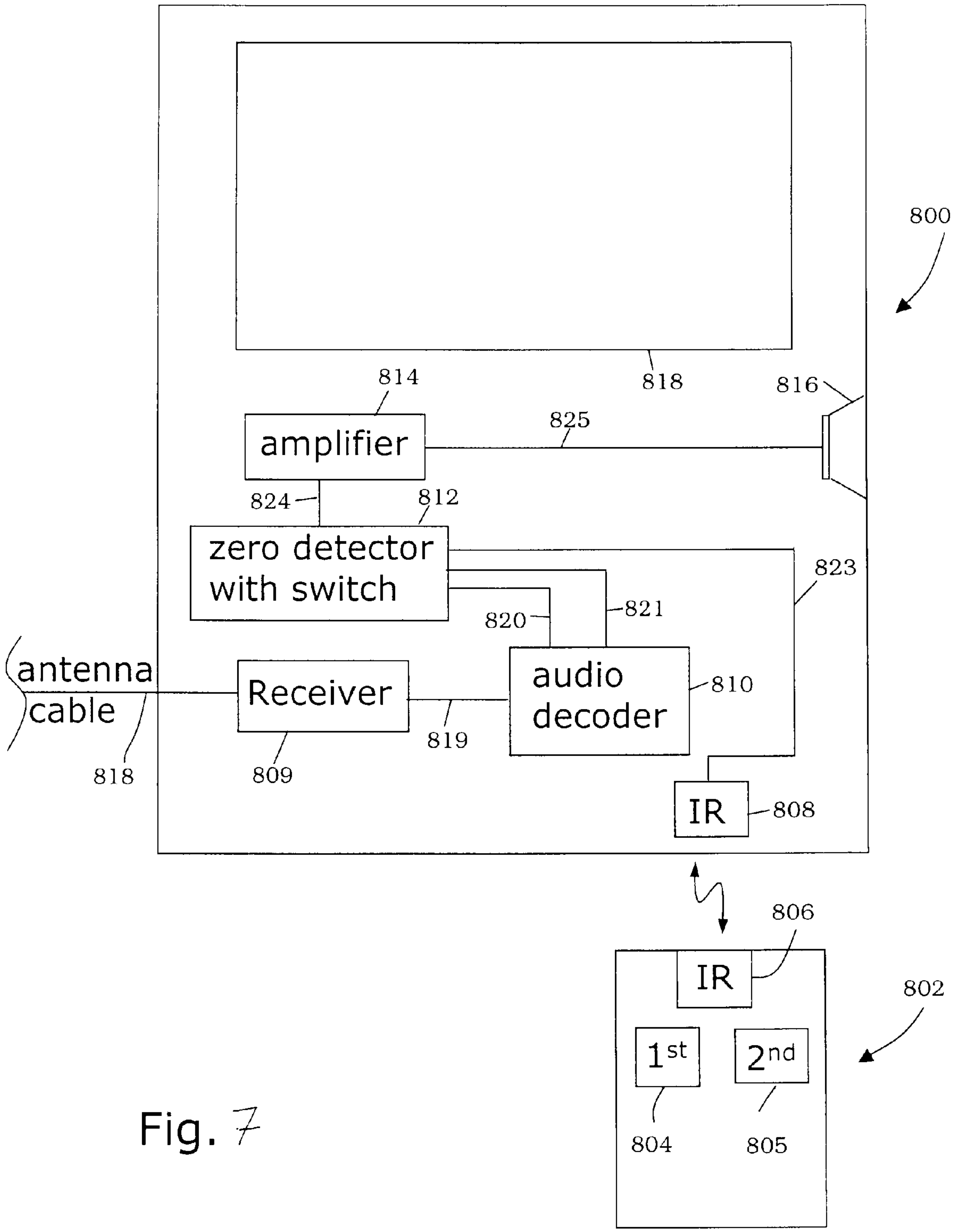
FIG. 7 shows a television according to a further embodiment of the invention.

FIG. 7 shows a television set 800 which is controllable by a remote control 802. Remote control 802 may have a first and second button 804, 805 allowing the user to switch between different audio channels of a television program. Remote control 802 further has a sending unit 806 allowing transmission of commands to a receiving unit 808 of television 800.

Besides receiving unit 808, television 800 may comprise a receiver 809, an audio decoder 810, a zero detector 812 and an amplifier 814 as well as a loudspeaker 816 and display 818.

Receiver 809 may be configured to receive a television signal 818 and may e.g. split sound and vision signals off the television signal 818. A respectively split off audio signal 819 is then provided to audio decoder 810. Audio decoder 810 decodes from audio signal 819 a first and second audio signal 820, 821. When the user inputs a channel switch e.g. by selecting a second channel via button 805 on remote control 802, receiving unit 808 may determine a switching signal 823 indicating that a switching from first audio signal 820 to second audio signal 821 should occur. Accordingly, zero detector 812 detects the next zero crossing of first audio signal 820 and next zero crossing of second audio signal 821. Further, zero detector 812 might include a switch (e.g. similar to the embodiment of FIG. 6). Thus, zero detector 812 may output a respective output signal 824 to amplifier 814. Amplifier 814 amplifies the output signal and outputs a respective amplified output signal 825 to loudspeaker 816.

Figure 8:
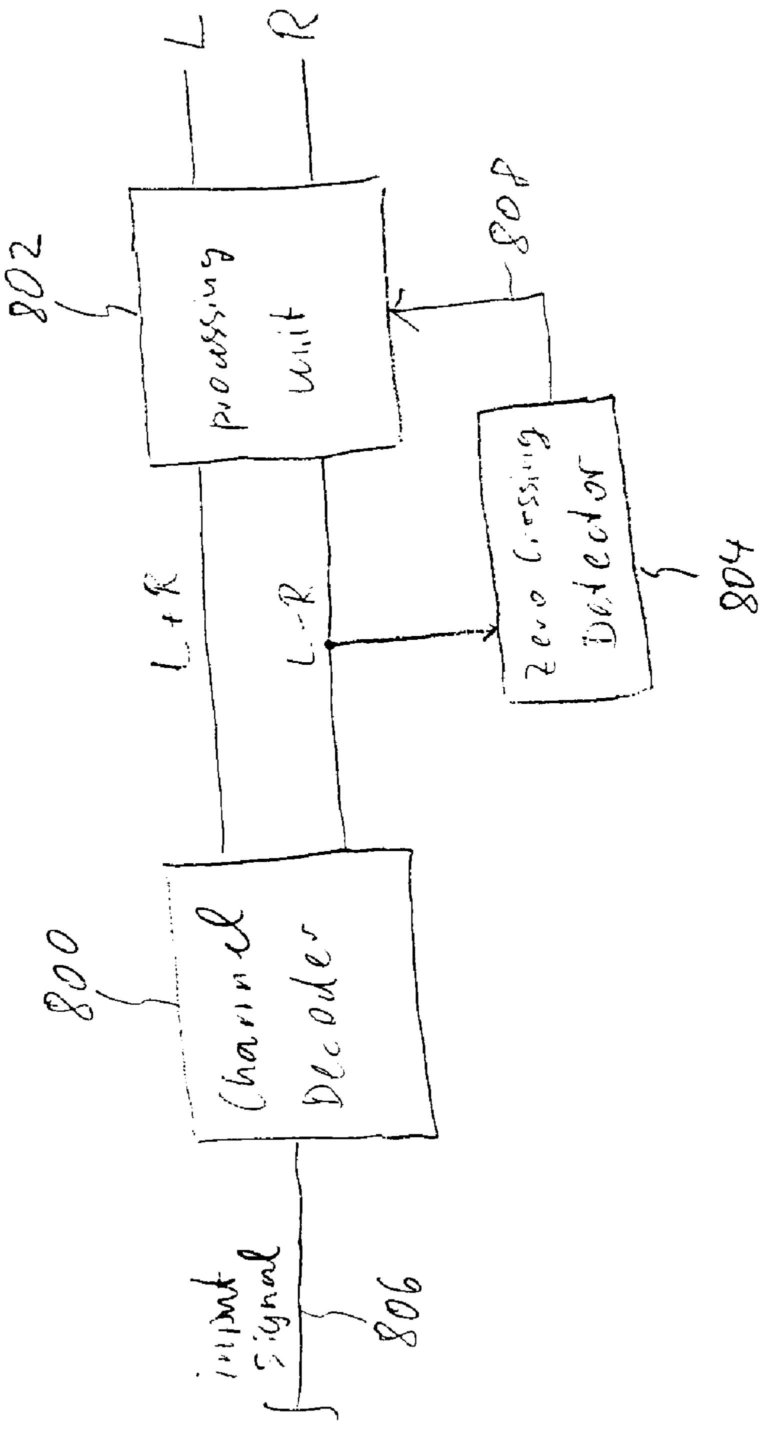
FIG. 8 shows a further embodiment of the invention where a difference signal L−R is decoded.

FIG. 8 shows a channel decoder 800, processing unit 802 and zero crossing detector 804.

Channel decoder 800 decodes input signal 806 e.g. a radio signal or the like. The output signals of channel decoder 800 are a sum signal L+R and a difference signal L−R. Thus, it is possible that input signal 806 comprises difference signal L−R.

Zero crossing detector 804 detects a zero crossing of difference signal L−R and outputs a zero crossing signal 808 to processing unit 802. Based on zero crossing signal 808, zero crossing detector 804 may control processing unit 802.

For example, when zero crossing detector 804 detects a zero crossing of difference signal L−R, then zero crossing detector 804 may switch audio output L, R of processing unit 802 from outputting stereo sound to outputting mono sound or vice versa. Processing unit 802 determines outputs L, R to either output the sum signal L+R (mono sound) or stereo sound, wherein the stereo sound, i.e. a left and right channel, is determined based on the sum signal L+R and L−R.

Figure 9:
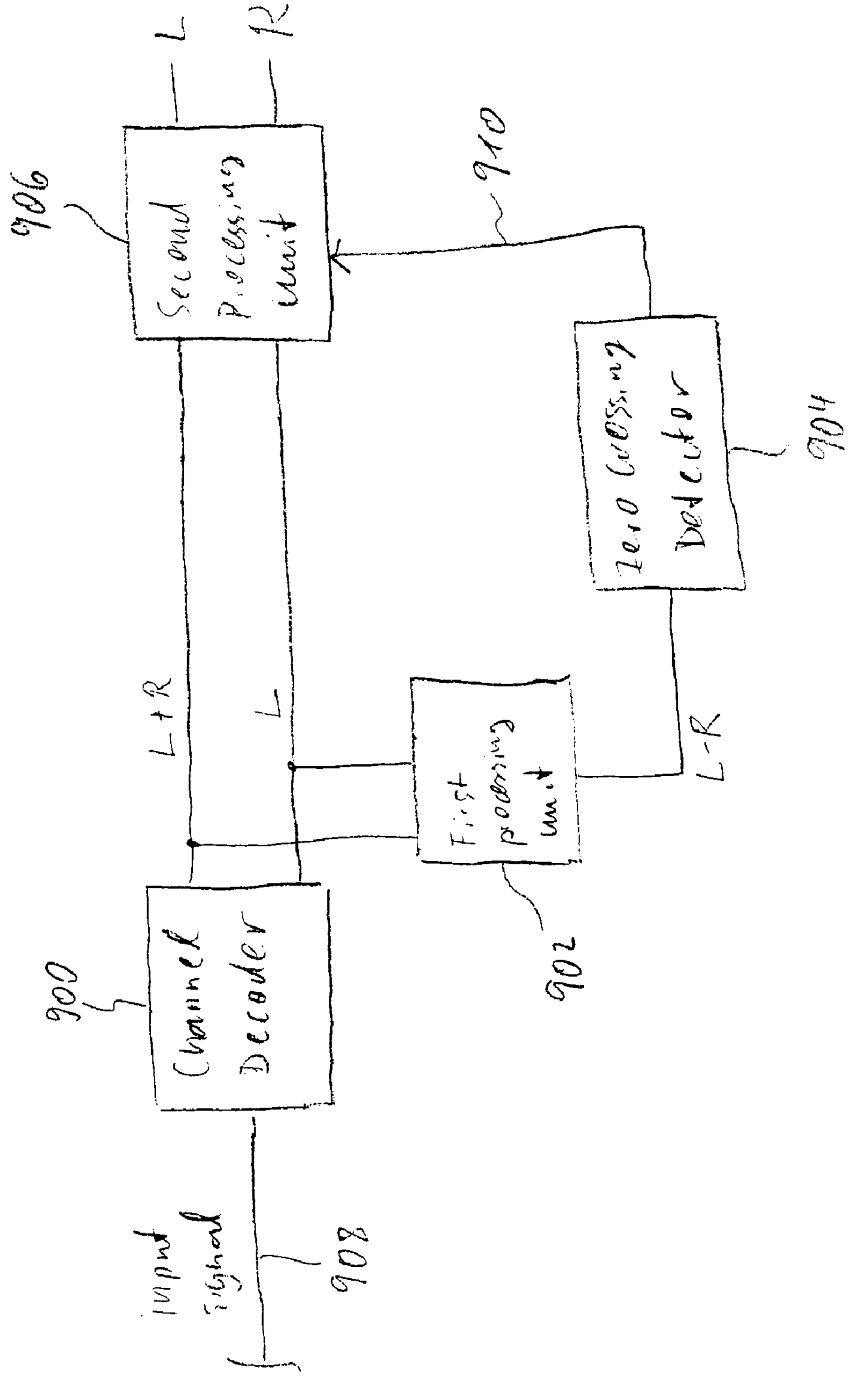
FIG. 9 shows a further embodiment of the invention.

FIG. 9 shows a further embodiment of the invention comprising a channel decoder 900, first processing unit 902, zero crossing detector 904, and second processing unit 906.

Channel decoder 900 may decode input signal 908 and outputs a sum signal L+R and a left channel signal L. Such a situation may e.g. occur when input signal 908 is a PAL television signal.

First processing unit 902 determines a difference signal L−R based on sum signal L+R and left channel signal L.

Second processing unit 906 outputs a left channel audio output L and right channel audio output R, wherein L and R may be controlled to output mono or stereo sound. Second processing unit 906 may be controlled via zero crossing signal 910 determined by zero crossing detector 904. Zero crossing detector 904 may control second processing unit 906 to switch between outputting mono or stereo sound.

Zero crossing detector 904 may switch from mono to stereo sound or vice versa if the difference signal L−R crossed zero or is essentially equal to zero.

The embodiment of FIG. 9 may e.g. be useful when integrated in a television set.

It should be noted that if one of the signals comprises a DC part there may arise the situation that the difference signal L−R does not cross zero. Also, for other reasons the difference signal L−R may not cross zero. In such a situation, there may be provided a timer and the switching from mono to stereo sound and/or from a first to a second audio channel may occur after a timeout.

The invention claimed is:

1. A method for outputting an audio signal to an audio output, comprising:

outputting a first audio signal to said audio output;

providing a second audio signal;

determining a difference signal of a left audio channel and a right audio channel;

determining a point in time, at which said difference signal is approximately equal to zero or crosses zero; and switching, at said point in time, said audio output from outputting said first audio signal to outputting said second audio signal.

2. The method according to claim 1, wherein said first audio signal is a mono audio signal and said second audio signal is a stereo audio signal, and wherein said left audio channel corresponds to a of a left channel of said stereo audio signal and said right audio channel corresponds to a right channel of said stereo audio signal.

3. The method according to claim 1, wherein said first audio signal is a stereo audio signal and said second audio signal is a mono audio signal, and wherein said left audio channel corresponds to left channel of said stereo audio signal and said right audio channel corresponds to a right channel of said stereo audio signal.

4. The method according to any of the preceding claims, comprising determining an intermediate audio signal, wherein said intermediate audio signal corresponds to a mixture of said first and second audio signals.

5. The method according to claim 4, comprising outputting said intermediate audio signal starting at said point in time for a predetermined period of time.

6. The method according to claim 5, wherein, within said predetermined period of time, said first audio signal is faded out and said second audio signal is faded in, wherein said first and second audio signals are superimposed.

7. The method according to claim 1, comprising determining a further point in time, wherein at said further point in time said second audio signal is essentially equal to zero wherein outputting said second audio signal is started at said further point in time.

8. An integrated circuit configured to perform the method according to claim 1.

9. A method for outputting an audio signal to an audio output, comprising:
- outputting a first audio signal to said audio output;
- providing a second audio signal;
- determining a first point in time, at which said first audio signal or a derivative of said first audio signal or a derivative of said second audio signal is approximately equal to zero or crosses zero;
- determining a further point in time, at which said second audio signal is approximately equal to zero; and
- switching, at said first point in time, said audio output from outputting said first audio signal to outputting no audio signal and switching to outputting said second audio signal at said further point in time.

10. An audio decoder, comprising:
- a channel decoding unit configured to receive a first and second audio signal and to determine a difference signal of a left audio channel and a right audio channel;
- a zero crossing detector configured to determine a point in time, at which said difference signal is approximately equal to zero or crosses zero, and further configured to output a switching signal at said point in time;
- said channel decoding unit being further configured to tune to said first audio signal and to said second audio signal and to output said first and/or second audio signal depending on said switching signal.

11. The audio decoder according to claim 10, wherein said first audio signal is output by said channel decoding unit before receiving said switching signal and said second audio signal is output afterwards.

12. The audio decoder according to claim 10, wherein said first audio signal is a mono audio signal and said second audio signal is a stereo audio signal, and said left audio channel corresponds to a left channel of said stereo audio signal and said right audio channel corresponds to a right channel of said stereo audio signal.

13. The audio decoder according to claim 10, wherein said first audio signal is a stereo audio signal and said second audio signal is a mono audio signal, and said left audio channel corresponds to a left channel of said stereo audio signal and said right audio channel corresponds to a right channel of said stereo audio signal.

14. The audio decoder according to claim 10, wherein said zero crossing detector is further configured to determine a further point in time, wherein at said further point in time said second audio signal is essentially equal to zero or crosses zero wherein outputting said second audio signal is started at said further point in time.

15. The audio decoder according to claim 11, comprising a fading mechanism configured to receive said first and second audio signals and to fade out said first audio signal and to fade in said second audio signal.

16. A non-transitory computer having stored thereon a computer program that includes instructions that cause a computer to execute a method for outputting an audio signal to an audio output, the method comprising:
- outputting a first audio signal to said audio output;
- providing a second audio signal;
- determining a difference signal of a left audio channel and a right audio channel;
- determining a point in time, at which said difference signal is approximately equal to zero or crosses zero; and
- switching, at said point in time, said audio output from outputting said first audio signal to outputting said second audio signal.

* * * * *